United States Patent [19]

Kobayashi

[11] Patent Number: 4,563,788
[45] Date of Patent: Jan. 14, 1986

[54] TOP DRYING NOZZLE DEVICE FOR VEHICLE WASHING APPARATUS

[76] Inventor: Minoru Kobayashi, 3-1-3-401, Mitsuwadai, Chiba-Shi, Chiba-Ken, Japan

[21] Appl. No.: 598,455

[22] Filed: Apr. 9, 1984

[30] Foreign Application Priority Data

Apr. 8, 1983 [JP] Japan .............................. 58-51489[U]

[51] Int. Cl.⁴ ............................................... B60S 3/04
[52] U.S. Cl. ................................ 15/312 R; 15/316 R; 34/229; 34/243 C; 74/103; 239/186; 239/587; 414/197
[58] Field of Search .................. 15/316 R, 319, 312 R; 34/229, 243 C; 239/185, 186, 587; 134/45, 123; 74/103; 414/917

[56] References Cited

U.S. PATENT DOCUMENTS

| 3,177,515 | 4/1965 | Bahnson, Jr. | 15/319 X |
| 3,765,104 | 10/1973 | Takeuchi | 34/229 |
| 3,991,433 | 11/1976 | Cirino | 15/316 R X |
| 3,995,746 | 12/1976 | Usagida | 414/917 X |

FOREIGN PATENT DOCUMENTS 92444 12/1961 Denmark ............................ 239/587

Primary Examiner—Philip R. Coe
Attorney, Agent, or Firm—Wenderoth, Lind & Ponack

[57] ABSTRACT

A top drying nozzle device for a vehicle washing apparatus has a link mechanism for supporting a top nozzle. The link mechanism has a pantagraph mechanism and two parallel link mechanisms so that the top nozzle can be moved vertically in a forward position of two side nozzles.

2 Claims, 4 Drawing Figures

TOP DRYING NOZZLE DEVICE FOR VEHICLE WASHING APPARATUS

BACKGROUND OF THE INVENTION

This invention relates to a drying device for a vehicle washing apparatus and more particularly to a link mechanism for supporting a top drying nozzle suspended from an inverted U-shaped frame member.

In general, a vehicle washing apparatus has an inverted U-shaped frame member movable along a pair of rails between which a vehicle to be washed is parked. The frame member comprises two side frames disposed vertically and a top frame disposed horizontally. Inside the side frames are rotatably provided two side brushes, and under the top frame is rotatably provided a top brush. There is also provided a water spray device in the frame member. With those brushes being rotated and the water spray device being operated, the frame member is moved along the rails to wash the body of the vehicle.

In addition, the vehicle washing apparatus has also a drying device for blowing air against the body of the vehicle in order to blow off water drops left on the body after the body has been washed by the water spray device. The drying device comprises a pair of side nozzles which are fixed to the side frames of the inverted U-shaped frame member and a top nozzle which is held on the top frame thereof so as to be moved upward and downward in accordance with the height of the vehicle to be washed and the configuration of the top surface thereof.

Such a drying device is disclosed in Japanese Utility Model Publication No. 24386/1981. In this Publication, the top nozzle of the drying device is supported at the lower portion of a link which is pivotably held by a vertical arm fixed to the top frame of an inverted U-shaped frame member. A driving cylinder is provided, in the frame member, for swinging the link upward and downward in accordance with the configuration of the top surface of a vehicle to be washed.

In such a link mechanism, it is unavoidable that the position of the top nozzle is changed in the backward and forward directions when the link is swung to raise and lower the top nozzle in accordance with the configuration thereof.

In drying in such a manner that water drops left on the surface of the body of the vehicle are blown off by the drying device to finish the washing operation, the top nozzle must be moved ahead of the two side nozzles to blow off the water drops completely, because some of the water drops on the top surface thereof are dropped along the side surfaces of the vehicle body, and the water drops dripping along the side surfaces thereof have to be blown off by the side nozzles following the movement of the top nozzle. If the top nozzle is moved following the side nozzles, the water drops blown off by the top nozzle drip along a region of the side surfaces thereof against which air has already been blown by the side nozzles thereby to leave the water drops on the side surfaces.

In the top nozzle of the above conventional drying device, as the top nozzle is moved backward and forward when the link for supporting the top nozzle is swung to raise and lower it in accordance with the configuration of the top surface thereof, the top nozzle cannot be always placed ahead of the side nozzles. If the top nozzle is placed far ahead of the side nozzles to always keep the top nozzle located ahead of the side nozzles, the width of the top frame for supporting the top nozzle has to be great thereby making the frame member bulky.

To solve this problem, Japanese Utility Model Publication No. 2683/1983 discloses a drying device in which a top nozzle and a pair of side nozzles are integrated with each other to form an integrated nozzle unit supported by an inverted U-shaped frame member so as to be moved upward and downward. The integrated nozzle unit is raised and lowered by a winch mechanism. However, the winch mechanism is relatively complicated.

SUMMARY OF THE INVENTION

It is an object of this invention to provide a top drying nozzle device, for a vehicle washing apparatus, which can be kept located ahead of a pair of side nozzles without making the device complicated and bulky.

According to this invention, there is provided a top drying nozzle device suspended from a top frame of a U-shaped frame member moving backward and forward for blowing air against a top surface of a body of a vehicle in order to blow off water drops or drips left on the top surface thereof after a water-spray-operation, said drying top nozzle comprising: (1) a top nozzle located always ahead of a pair of side nozzles each provided on a side frame of the U-shaped frame member, in the moving direction thereof, said top nozzle being connected to an air-source such as a fan or a blower; (2) a link means for supporting the top nozzle, said link means comprising (a) a first main arm extending substantially horizontally, one end of which is pivotably connected to a supporting plate fixed to the inverted U-shaped frame member, (b) a second main arm extending substantially vertically, the upper end of which is pivotably connected to the other end of the first main arm so as to form an L-shaped link, (c) a first sub-arm located below and parallel to the first main arm, one end of which is connected to a midportion of the second main arm, (d) a second sub-arm extending parallel to the second main arm, the lower end of which is pivotably connected to the other end of the first sub-arm, and the upper end of which is pivotably connected to a midportion of the first main arm, (e) a first supplementary arm located above and parallel to the first main arm to form a first parallel link with the first main arm, one end of which is pivotably connected to the supporting plate fixed to the frame member, (f) a second supplementary arm located parallel to the second main arm to form a second parallel link with the second main arm for supporting horizontally the top nozzle at its lower end, (g) a lower horizontal connecting plate for pivotably connecting the lower ends of the second main arm and the second supplementary arm to each other, and (h) an upper connecting plate for pivotably holding the other end of the first supplementary arm, the connecting point of the first main arm and the second main arm, and the upper end of the second supplementary arm, said first and second main arms and the first and second sub-arms forming a pantagraph mechanism for moving the top nozzle vertically; and (3) a driving means for moving the connecting point of the first and second sub-arms vertically.

The nature, utility, and further features of this invention will be more clearly apparent from the following detailed description of a preferred embodiment of the invention when read in conjunction with the accompanying drawings.

DETAILED DESCRIPTION OF THE INVENTION

Figure 1:
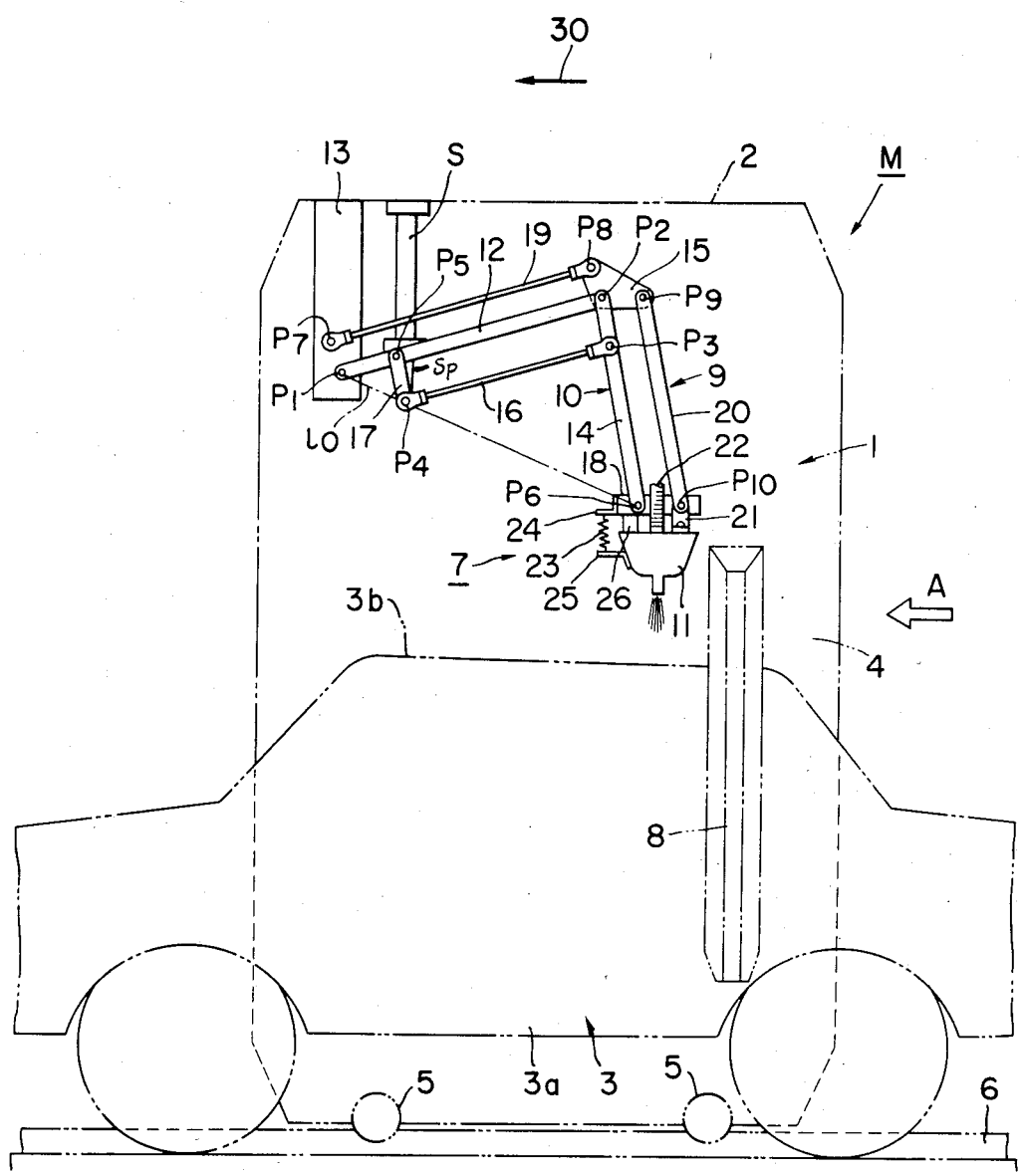
FIG. 1 is a side elevation showing a schematic construction of a top drying nozzle device according to the present invention.

In FIG. 1, a vehicle washing apparatus M has an inverted U-shaped frame member 1 as viewed in the direction of arrow A in FIG. 1. The frame member 1 comprises a top frame 2 extending horizontally over a vehicle 3 and a pair of side frames 4 suspended from the opposite ends of the top frame 2. At the bottom of each side frame are provided a plurality of wheels 5 which roll on a rail 6. The top frame and side frames are formed integrally in an inverted U-shape.

The frame member 1 is provided with some equipments such as brushes, water sprays and other items which are well known and not shown in FIG. 1. In addition, on the frame member 1 is mounted a drying device 7 for blowing air against the body of the vehicle 3 in order to blow off water drops left on its body after a water spray operation. The drying device 7 has a pair of side nozzles 8 each fixed to the inside of the side frame 4 and has a top nozzle device 9 suspended from the top frame 2.

The top nozzle device 9 has a link mechanism 10 for supporting a top nozzle 11 at its lower end. The link mechanism 10 has a first main arm 12 extending substantially horizontally, one end of which is pivotably connected, at a point $P_1$, to the lower part of a supporting plate 13 suspended from the top frame 2, and the other end of which is pivotably connected, at a point $P_2$, to the upper end of a second main arm 14 extending substantially vertically to form an L-shaped link with the first main arm 12. The point $P_2$ is located on an upper triangular connecting plate 15. A first sub-arm 16 is provided below and parallel to the first main arm 12. One end of the first sub-arm 16 is pivotably connected, at a point $P_3$, to a midportion of the second main arm 14. The other end of the first sub-arm 16 is pivotably connected, at a point $P_4$, to the lower end of a second sub-arm 17 which is provided parallel to the second main arm 14. The upper end of the second sub-arm 17 is pivotably connected, at a point $P_5$, to a midportion of the first main arm 12.

Moreover, a straight line $l_0$ passing the two points $P_1$ and $P_4$ extends to a point $P_6$ (the points $P_1$, $P_4$ and $P_6$ are in a straight line) at which the lower end of the second main arm 14 is pivotably connected to one end of a lower horizontal connecting arm 18.

Accordingly, a span $\overline{P_5P_2}$ on the first main arm 12, a span $\overline{P_2P_3}$ on the second main arm 14 and the first and second sub-arms 16 and 17 form a well known parallelogram link. In addition, the first and second main arms 12 and 14 and the first and second sub-arms 16 and 17 form a well known pantagraph mechanism.

In this pantagraph mechanism, the point $P_4$ is connected to the lower end of a piston rod $S_p$ of a driving fluid cylinder S which is actuated by air or oil. The cylinder S is vertically suspended from the top frame 2 so that the point $P_4$ can be moved vertically when the cylinder S is actuated. According to the principle of the pantagraph mechanism, the two points $P_4$ and $P_6$ are moved parallel to each other. Therefore, if the point $P_4$ is moved vertically, the point $P_6$ is also moved vertically.

Above and parallel to the first main arm 12 is provided a first supplementary arm 19, one end of which is pivotably connected, at a point $P_7$, to the supporting plate 13 and the other end of which is pivotably connected, at a point $P_8$, to the upper triangular connecting plate 15. The first main arm 12 and the first supplementary arm 19 form a first parallel link mechanism and the two points $P_1$ and $P_7$ are set fixedly. Accordingly, the inclination of a span $\overline{P_8P_2}$ does not change even if the first parallel link is swung upward and downward. That is, the upper triangular connecting plate 15 is not rotated about the point $P_2$ when the first parallel link is swung upward and downward.

Figure 2:
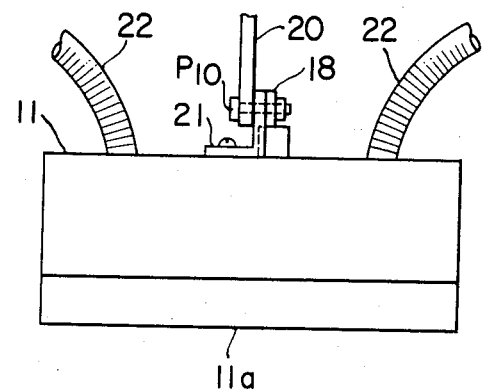
FIG. 2 is a front elevation showing a top nozzle.

Along the second main arm 14 is disposed a second supplementary arm 20 to form a second parallel link mechanism. The upper end of the arm 20 is pivotably connected, at a point $P_9$, to the upper triangular connecting plate 15, and the lower end thereof is pivotably connected, at a point $P_{10}$, to the horizontal connecting arm 18 and a holding member 21. The holding member 21 is fixed to the center portion of the upper surface of the top nozzle 11 as shown in FIG. 2. The top nozzle 11 extends so as to traverse the U-shaped frame member 1 and two flexible air tubes 22 and 22 are connected to the upper surface thereof in order to supply pressurized air, supplied from an air-source such as a blower or a fan, which is discharged from the blow-off slit 11a of the top nozzle 11.

Figure 3:
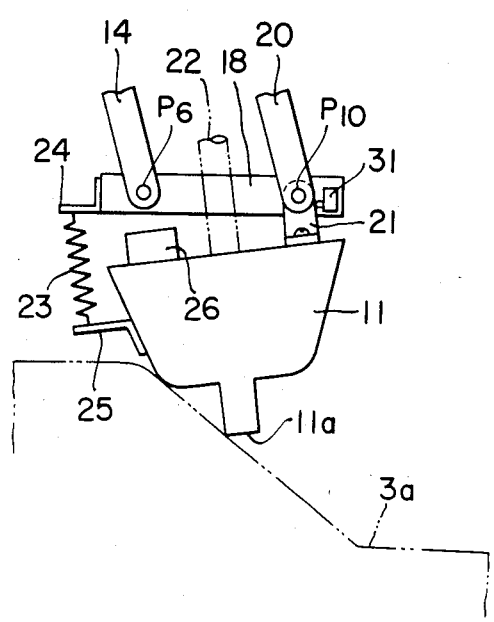
FIG. 3 is a side elevation showing a state wherein the top nozzle collides with an obstacle.

The lower horizontal connecting plate 18 extends horizontally along the upper surface of the top nozzle 11 in the moving direction of the frame member 1. The rear end (right end as viewed in FIG. 1) of the plate 18 is simultaneously connected to the lower end of the arm 20 and the holding member 21, and the front end (left end as viewed in FIG. 1) is connected to the lower end of the arm 14. To the front end face of the plate 18 is fixed the upper end of a spring 23 through a member 24 as shown in FIGS. 1 and 3. The lower end of the spring 23 is fixed to member 25 which is fastened to the side face of the top nozzle 11 so that the spring 23 urges the top nozzle 11 upwardly. On the upper surface of the top nozzle 11 is placed a spacer 26 for keeping the top nozzle 11 horizontal in a state wherein its upper face abuts against the lower face of the plate 18 by means of the spring 23. As the top nozzle 11 is supported at two positions separated from each other in the moving direction of the frame member 1, the top nozzle 11 can be held stably.

The operation of the top drying nozzle device according to this invention is as follows.

The inverted U-shaped frame member 1 is moved in the right direction as viewed in FIG. 1 during the water-spray-operation. After the water-spray-operation has been finished, the frame member 1 is moved in the left direction as indicated by an arrow 30. The top nozzle 11 is located ahead of the side nozzles 8 in the moving direction of the frame member 1 when water drops left on the body of the vehicle 3 are blown off by the nozzles 8 and 11. The top nozzle 11 must be moved in accordance with the height of the upper surface 3b of the vehicle 3. When the driving cylinder S is operated to extend the piston rod $S_p$ to lower the top nozzle 11, the top nozzle 11 is moved downward.

Figure 4:
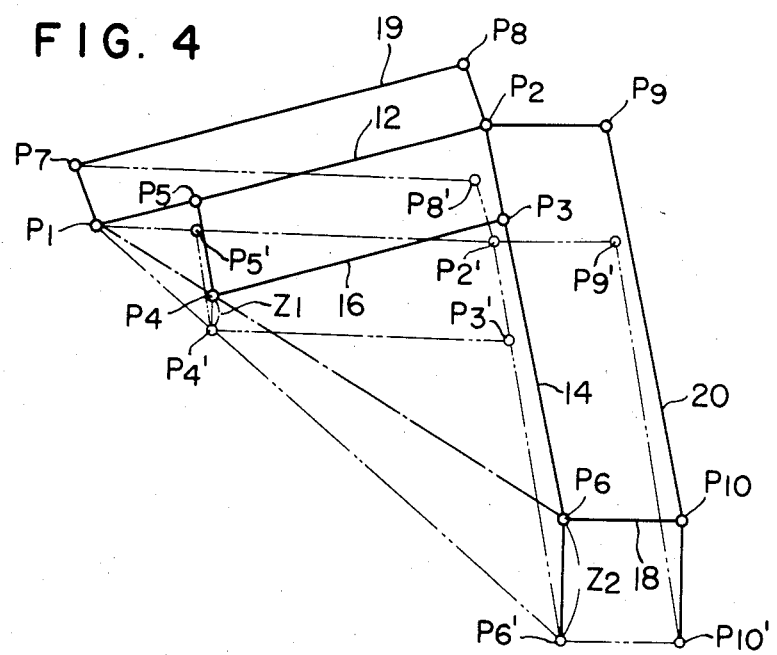
FIG. 4 is a skeleton diagram showing the motion of a link mechanism for supporting the top nozzle.

The movement of the link mechanism at this time will be explained in detail with reference to FIG. 4.

When the point $P_4$ is lowered vertically to the point $P_4$, by extension of the piston rod of the drive cylinder S, the point $P_6$ is lowered vertically to the point $P_6'$ according to the principle of the pantagraph mechanism. At this time, because the upper triangular connecting plate 15 is lowered without rotating about the point $P_2$, the span $\overline{P_2P_9}$ is lowered in a state wherein it is kept horizontal. Therefore, the lower horizontal connecting plate 18 is also lowered in its horizontal state, so that the top nozzle 11 is lowered vertically in its horizontal state without moving backward or forward. If the point $P_4$ is lowered through a distance $Z_1$, the distance $Z_2$ of downward movement of the horizontal plate 18 is given by the following expression.

$$Z_2 = Z_1 \times \frac{\overline{P_1P_6}}{\overline{P_1P_4}} = Z_1 \times \frac{\overline{P_1P_2}}{\overline{P_1P_5}}$$

Thus, the top nozzle 11 will always be located ahead of the side nozzles 8 in the moving direction of the frame member 1, and when the water drops left on the body are blown off by the nozzles 8 and 11, the water drops blown off from the upper surface 3b of the vehicle body and dropping along its side body are reliably blown off by the side nozzles 8. Accordingly, the condition in which the water drops blown off by the top nozzle 11 drip on a region of the side body where the water drops have been blown off by the side nozzles 8 is reliably avoided.

When the top nozzle 11 happens to collide with an inclined surface 3a of the vehicle 3 or other obstacles, the top nozzle 11 is inclined backward and the spring 23 is expanded as shown in FIG. 3. Accordingly, damage to the device 7 or the body of the vehicle is reliably avoidable. A limit switch 31 may be provided on the side face of the horizontal connecting plate 18 so that the limit switch 31 can detect the inclination of the holding member 21 in order to stop the motion of the U-shaped frame member 1 or in order to retract the piston rod of the driving cylinder S.

What is claimed is:

1. A top drying nozzle device for suspending a top drying nozzle from the top frame of an inverted U-shaped frame member, which frame member is movable forwardly over the body of a vehicle in order to blow off water drops or drips left on the top surface thereof after a water-spray washing operation, and then backward, said nozzle device being suspended so that the top drying nozzle is vertically movable in a position ahead of, in the forward direction of movement of the frame member, a pair of side nozzles provided on the side frames of said U-shaped frame member, said top drying nozzle device comprising:

(1) a top drying nozzle and an air source to which said top drying nozzle is connected;
(2) a link means for supporting the top drying nozzle, said link means comprising:
 (a) a first main arm extending substantially horizontally, a supporting plate adapted to be fixed to said frame member, one end of said first main arm being pivotably connected to said supporting plate;
 (b) a second main arm extending substantially vertically, the upper end of which is pivotably connected to the other end of the first main arm so as to form an L-shaped link,
 (c) a first sub-arm located below and parallel to the first main arm, one end of which is connected to a mid-portion of the second main arm,
 (d) a second sub-arm extending parallel to the second main arm, a lower end of which is pivotably connected to the other end of the first sub-arm, and an upper end of which is pivotably connected to a mid-portion of the first main arm,
 (e) a first supplementary arm located above and parallel to the first main arm and forming a first parallel link with the first main arm, one end of which first main arm is pivotably connected to said supporting plate,
 (f) a second supplementary arm located parallel to the second main arm and forming a second parallel link with the second main arm,
 (g) a lower horizontal connecting plate pivotably connecting the lower ends of the second main arm and the second supplementary arm to each other, and
 (h) an upper connecting plate on which the other end of said first supplementary arm, the connecting point of the first main arm and the second main arm, and the upper end of the second supplementary arm are connected;
said first and second main arms and said first and second sub-arms forming a pantagraph mechanism for moving the lower horizontal connecting plate vertically; and
(3) a driving means connected to the connecting point of the first and second sub-arms for moving said connecting point vertically,
said top drying nozzle being pivotally supported on said lower horizontal connecting plate so as to swing rearwardly and upwardly relative to the forward direction of movement of said frame member, away from said connecting plate about an axis extending transversely of the direction of movement of said frame member, and an extensible connecting member connected between said top drying nozzle and said lower horizontal connecting plate urging said top drying nozzle to the horizontal position against said connecting plate.

2. A top drying nozzle device as claimed in claim 1 further comprising means for detecting the inclination of said top drying nozzle relative to the horizontal for providing a signal indicating the necessity to stop the movement of the frame member or to operate the driving means so as to raise said top drying nozzle.

* * * * *